Figure 1:
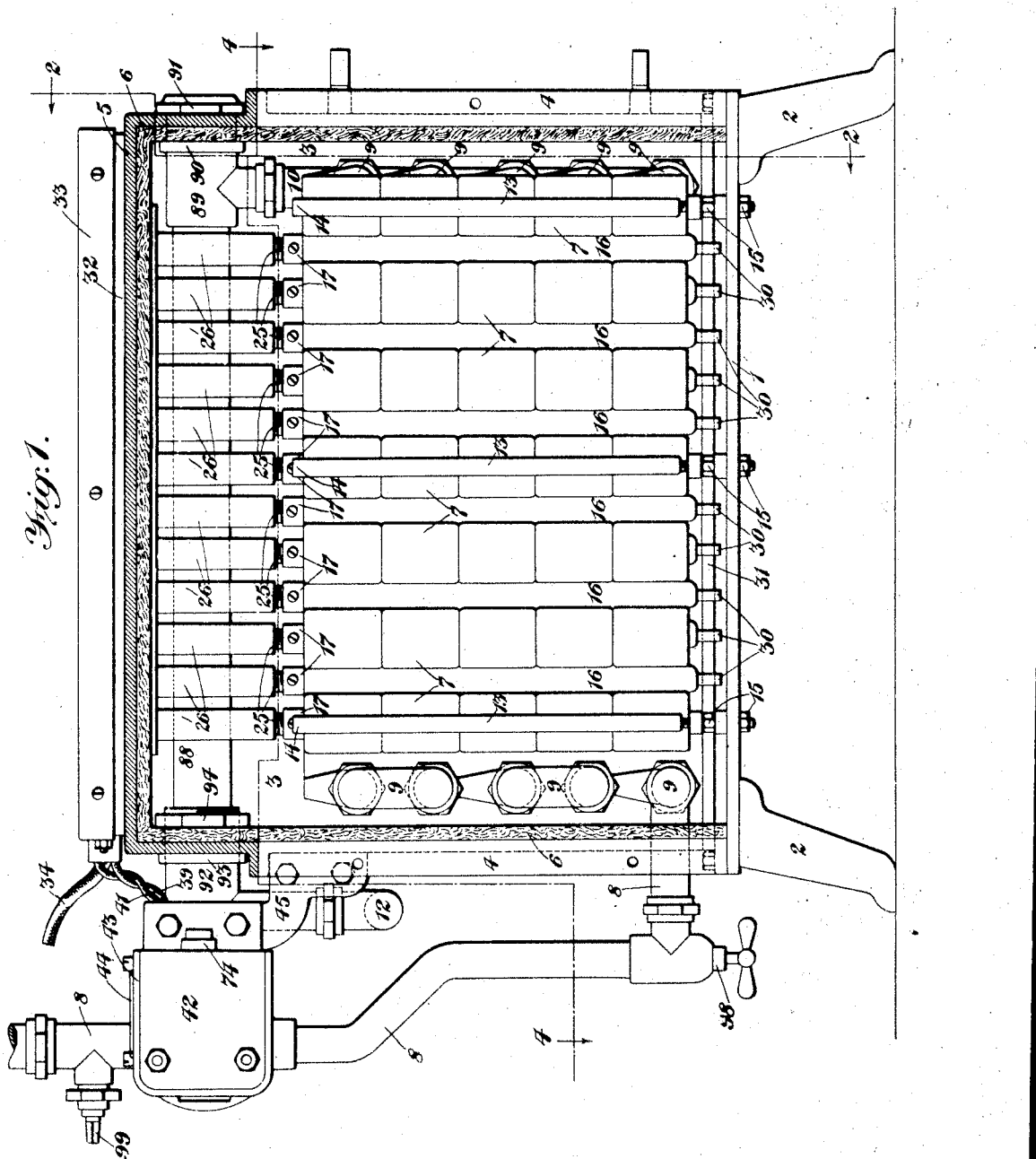

M. SIMON.
ELECTRIC WATER HEATER.
APPLICATION FILED JUNE 1, 1915.

1,194,886.

Patented Aug. 15, 1916.
7 SHEETS—SHEET 1.

Attest:
Charles A. Broker,
N. G. Butler.

Inventor
Maurice Simon,
by Rippey Kingsland
His Attorneys

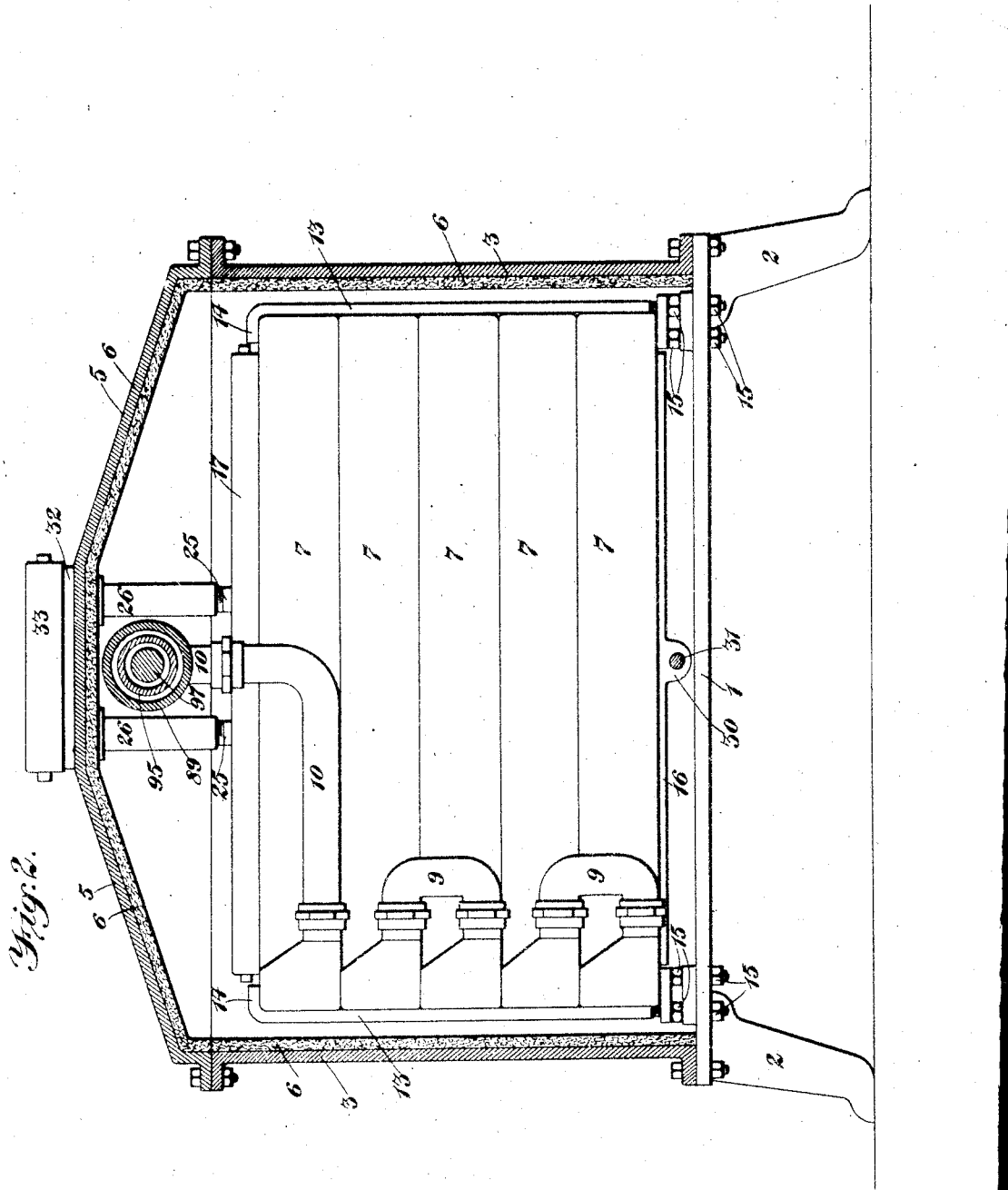

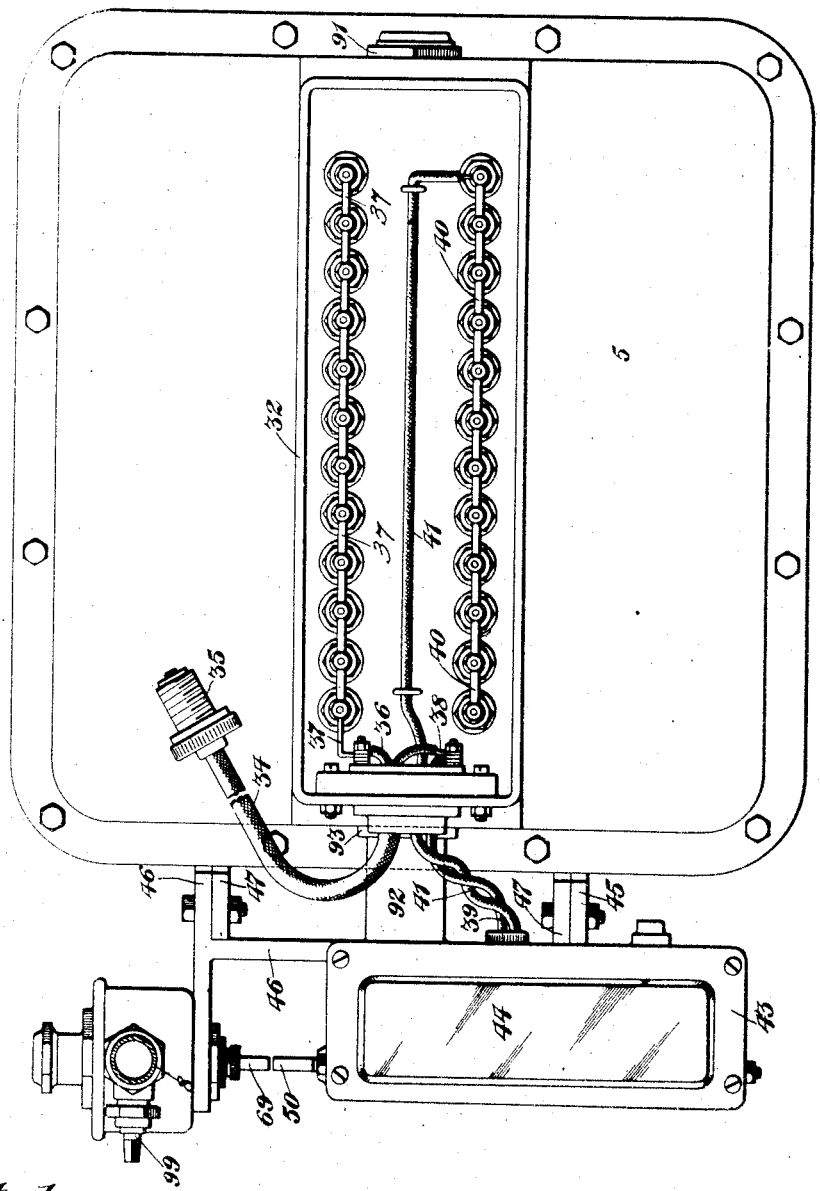

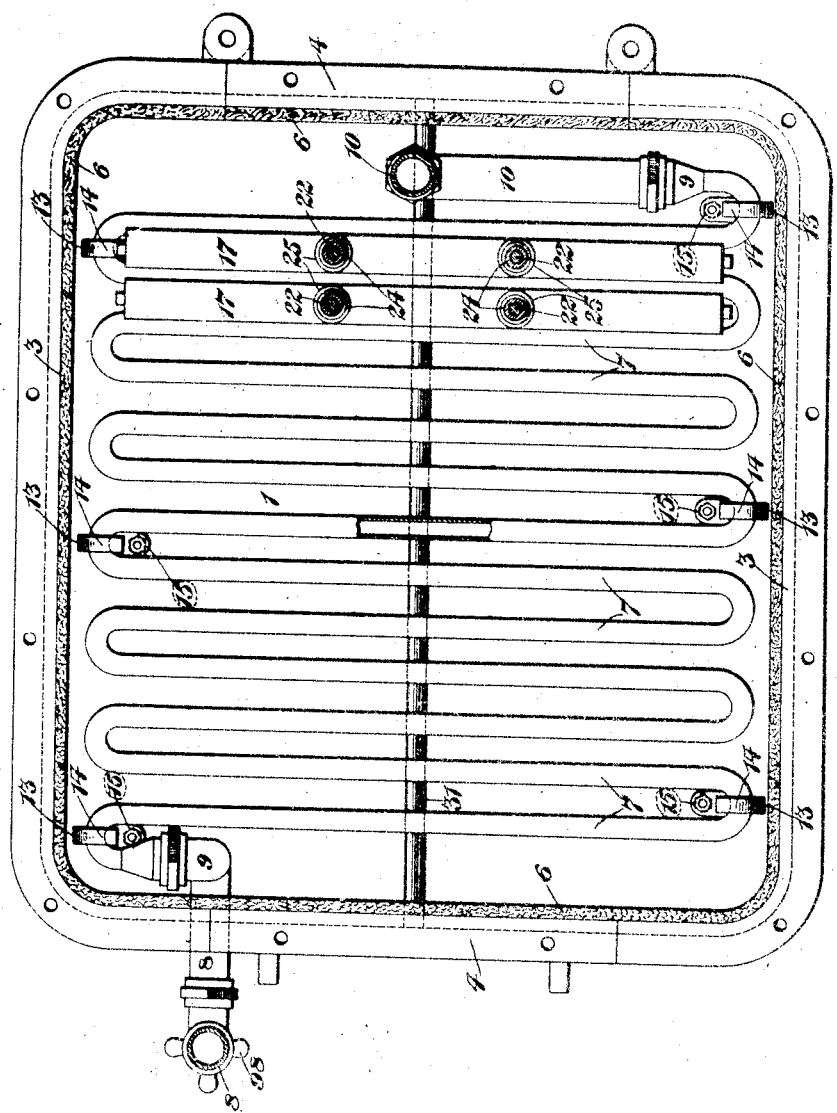

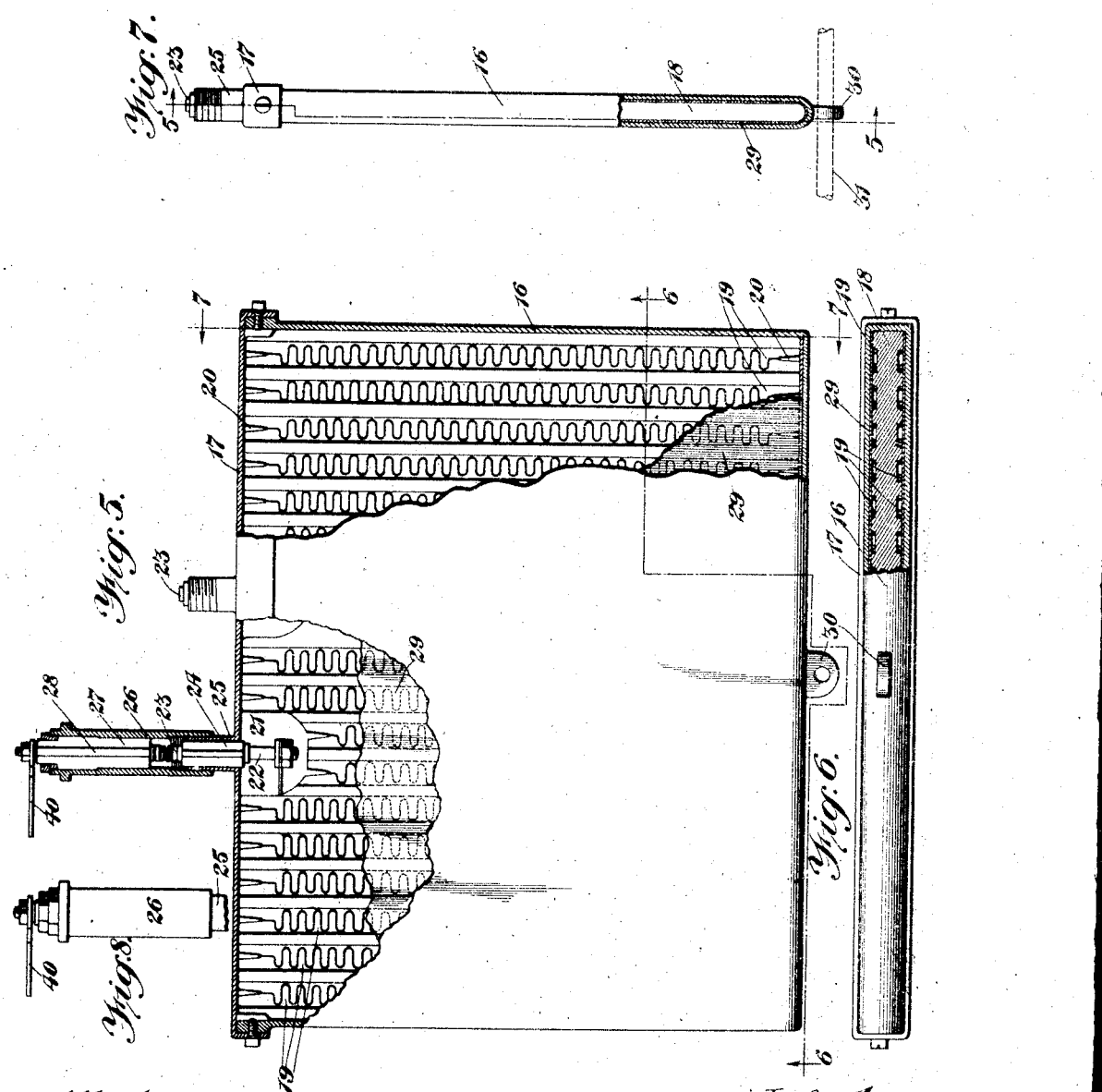

M. SIMON.
ELECTRIC WATER HEATER.
APPLICATION FILED JUNE 1, 1915.
1,194,886.
Patented Aug. 15, 1916.
7 SHEETS—SHEET 6.
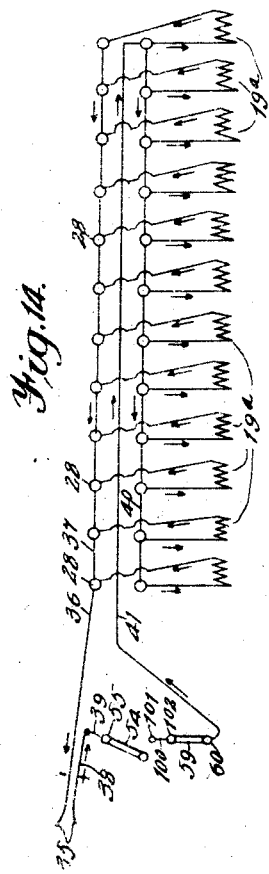
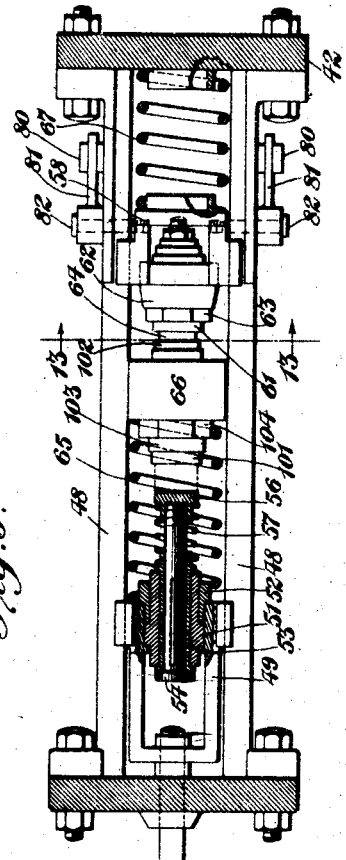
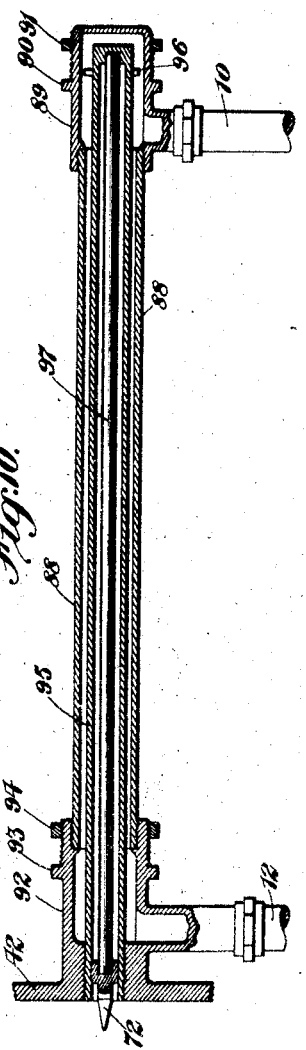
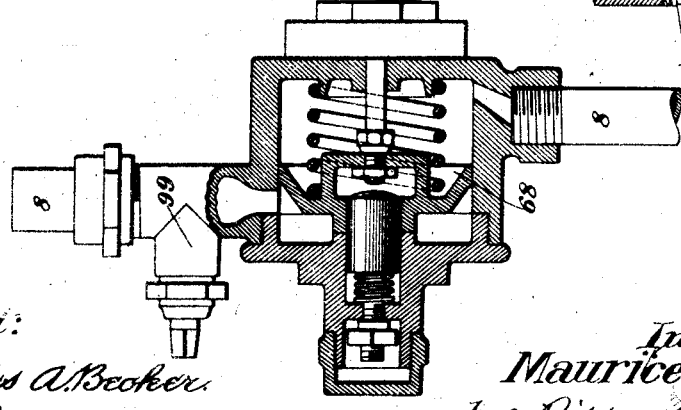
Attest:
Charles A. Becker.
N. G. Butler.
Inventor.
Maurice Simon,
by Rippey & Kingsland
His Attorneys.

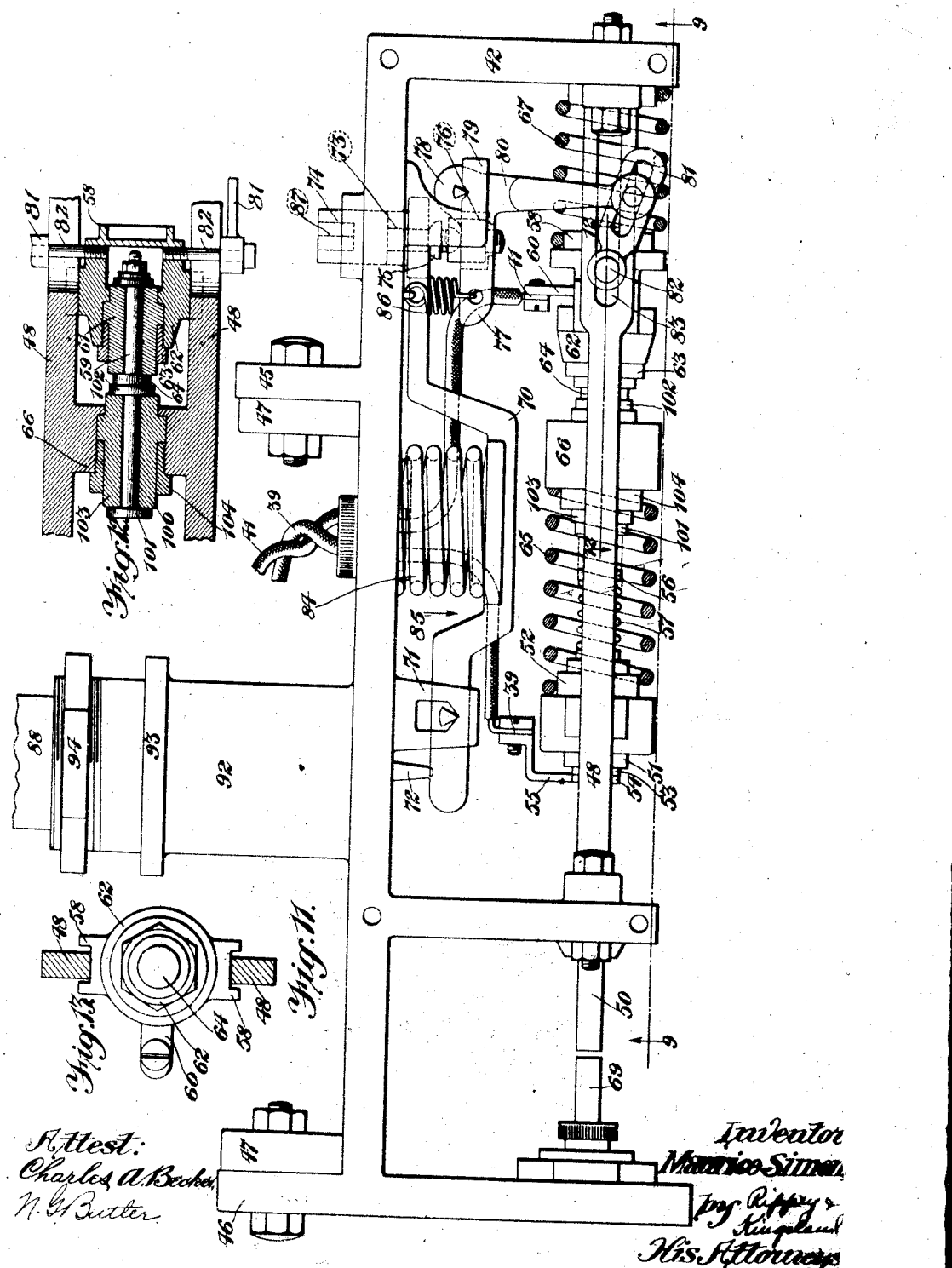

UNITED STATES PATENT OFFICE.

MAURICE SIMON, OF ST. LOUIS, MISSOURI.

ELECTRIC WATER-HEATER.

1,194,886.     Specification of Letters Patent.     Patented Aug. 15, 1916.

Application filed June 1, 1915. Serial No. 31,460.

*To all whom it may concern:*

Be it known that I, MAURICE SIMON, a citizen of the United States, residing at the city of St. Louis and State of Missouri, have invented a new and useful Automatic Instantaneous Electric Water-Heater, of which the following is a specification.

This invention relates to improvements in automatic instantaneous electric water heaters, and consists in the novel design, construction and arrangement of parts hereinafter more fully disclosed.

An object of the invention is to provide a water heater including electrical heating units so disposed as to impart heat to the water circulating through adjacently arranged coils, with provision for controlling the electrical energy for energizing the heating units automatically by manipulation of service faucets connected into the water circulating system.

Another object of the invention is to provide an electric water heater comprising a series of electrical heating units disposed between coils through which the water supply circulates, in combination with means for maintaining the temperature of the water supply at a predetermined degree, with provision for cutting off the electrical energy to the heating units when a predetermined maximum degree of heat has been attained.

Another object of the invention is to provide a water heater equipped with means for automatically energizing the heating units when water is withdrawn from the heater, in combination with supplemental means for controlling the heating units while the service faucet remains open, whereby the temperature of the water withdrawn from the heater may be automatically regulated.

Another object of the invention is to improve the construction of casings for water heaters, whereby a substantial saving of heat energy may be effected.

Another object of the invention is to provide an improved construction of heating coils for water heaters, whereby the heat may be radiated by the heating units may be imparted to the water circulating through the coils with a minimum degree of loss of heat energy.

With the foregoing specifically mentioned objects in view, and additional features and advantages obtainable from the construction which will be apparent without specific mention, I have designed, combined and arranged the various elements and devices hereinafter more fully disclosed, reference being made to the accompanying drawings, in which—

Figure 1 is a side elevation of a water heater embodying my invention, the side plate of the case of the heater being removed in order to more fully disclose the arrangement of the heating coils and heating units. Fig. 2 is a transverse section through the heater, substantially on the line 2—2 of Fig. 1. Fig. 3 is a plan view of a heater embodying my invention, the top plate of the case for the electrical connections being removed. Fig. 4 is a horizontal section through the case of the heater, taken substantially on the line 4—4 of Fig. 1, but with certain of the heating units removed. Fig. 5 is a side elevation of one of the heating units, with portions of the walls being broken away in order to show the inner construction thereof. Fig. 6 is a sectional view of one of the heating units, taken substantially on the line 6—6 of Fig. 5. Fig. 7 is a cross section through one end of the heating unit, taken substantially on the line 7—7 of Fig. 5. Fig. 8 is a detailed view in elevation of a portion of the electrical connection for the heating units. Fig. 9 is a side elevation, partially in section, taken substantially on the line 9—9 of Fig. 11 of the automatic devices for controlling the supply of the electrical energy for the heating units. Fig. 10 is a longitudinal section of the thermostat which is under the influence of the water passing from the heater, whereby the automatic device for controlling the temperature of the water is actuated. Fig. 11 is a plan view of the automatic devices for controlling the supply of electrical energy for the heating units. Fig. 12 is a section taken on the line 12—12 of Fig. 11. Fig. 13 is a cross section substantially on the line 13—13 of Fig. 9, showing certain details of the controlling device. Fig. 14 is a diagrammatic view illustrating the heating circuit with connections for controlling the same.

In the embodiment of the invention illustrated in the drawings, I have shown the case of the heater as including a base plate 1 supported by legs 2 at the four corners thereof, side plates 3 and end plates 4 bolted to said base plate, and a top 5 resting upon the side and end plates and bolted thereto. The top 5 is preferably formed with downwardly inclined walls with a central horizontal portion for supporting the exteriorly located supplemental case for increasing the electrical connections for the heating units.

The case is preferably lined throughout with a lining 6 of refractory material, thereby preventing the radiation of heat from the case and confining substantially all of the heat generated by the heating units within the case. Mounted within the case are the series of heating coils 7. The coils are arranged in horizontal convoluted sections, disposed one upon the other. In Fig. 4 of the drawings, the preferred form of the heating coils is clearly illustrated. From this view it will appear that the coils are formed in separate sections, the convolutions of the coils being in vertical alinement when mounted in the case, with spaces between the convolutions for receiving the heating units. The form of the piping out of which the coils are constructed is preferably oblong in cross section, the greatest dimension being the height when adjusted in the case, so that the side surfaces of each convolution of the series of coils will present the greatest surface area of the coils to the surface of the series of heating units disposed between the coil convolutions.

A supply passage 8 enters one end of the case adjacent to the bottom plate and is connected into one end of the lower series of coils, the coils being connected in series by union connections 9 so as to form a continuous circuitous passage from the lower end of the case at one side from the point where the supply passage enters to a point near the upper part of the case at the opposite end where the outlet passage 10 from the coils leads into the thermostat case 11, the water being drawn from the thermostat case through the service passage 12 which is connected into the hot water distribution system. Thus, it will be seen that the water to be heated enters at the lowest point of the coil system and passes back and forth through the circuitous passage, formed by the connected series of coils, and is inducted from the coil system from the top thereof, the water being gradually heated as it passes through the coil system and is delivered into the thermostat case from whence it is delivered to the distributing system.

In mounting the coils in the case it is preferred that means of some character for supporting the coils should be provided, in order to prevent excessive vibration of the coils.

In the embodiment of my invention shown there is a plurality of clamping rods 13 on either side of the coils. The rods 13 are arranged with hooked portions 14 which engage over the upper coils, as clearly shown in Fig. 4 of the drawings, said rods 13 passing through the bottom plate of the case and being clamped in position by adjustable nuts 15 in a manner that will be readily understood.

The heating units that are disposed between the parallel stretches of the heating coils are of novel construction and are illustrated in detail in Figs. 5 to 8 of the drawings. As the heating units are of duplicate construction it is necessary only to give a detailed description of one of the units. As illustrated in the figures of the drawings referred to each heating unit comprises a metal case 16 which is provided with a removable cover 17. A core 18 of insulating material is adapted to be mounted in the case and is provided with a series of grooves or recesses 19 in the face of each side thereof. At the top and bottom of each groove or recess is a transverse groove 20 and in the upper edge of the core member are formed enlarged recesses 21 for the reception of the ends of the resistance wire terminals that are wound on the core member.

The resistance circuit is composed of a length of resistance wire 19$^a$ preferably of nichrome wound on the core member in a continuous circuit, the stretches being seated in the recesses 19 and passing from side to side of the core member through the transverse grooves 20. The ends of the resistance circuit are connected respectively to the terminals 22 and 23 which pass out through insulated sleeves 24. The sleeves 24 are mounted in tubular extensions 25 of the covers 17. The extensions 25 are exteriorly threaded and are adapted to receive in threaded connection electrical plugs comprising a metal sleeve 26 containing a body 27 of insulating material and a metallic stem 28, the end of the stem 28 when the sleeve 26 is screwed over the end of the extension 25 making contact with the end of the terminal member. The arrangement of the construction just described is best illustrated in Fig. 5 of the drawings.

In order to insulate the resistance circuit from the sides of the case 16 a sheet 29 of insulating material is interposed between the core member and the inner walls of the case. At the bottom of the case of each heating unit I provide an ear 30 adapted to receive a retaining rod 31 for securing the heating units in proper adjustment when the same are disposed between the parallel stretches of the coils.

The electrical plug comprising the sleeve 26, the insulating body 27 and the stem 28, extends through the top 5 of the heater case and into a supplemental case 32 located upon the horizontal portion of the top 5. The case 32 is provided with a removable closure 33 so that access to the electrical connections for the heating units may be attained from the exterior of the heater. A two-wire cord 34 equipped with a plug 35 of usual construction for supplying electrical energy from the remote source, leads through one end of the case 32. One of the leads 36 of the electrical supply is connected in series with the respective stems 28 and thereby with the resistance terminal elements by bar connections 37, the other lead 38 of the circuit being connected to a terminal which has leading therefrom through the end of the case, a lead 39 terminating in one element of the circuit breaker which will be more fully described hereinafter. The opposite end of each of the resistance circuits, which are connected by bar connections 40, is in electrical communication with the other terminal of the circuit breaker by means of an electrical lead 41.

From the foregoing it will be observed that the heating units are connected into the energizing circuit in parallel series and that the circuit is controlled by a circuit breaker, the elements of which are connected respectively to the leads 39 and 41.

The circuit breaker constitutes the automatic control for the heating units and is actuated by a pressure in the water supply passage 8, and also by the thermostat which is under the influence of the heated water passing from the heater coils. The details of the circuit breaker and controlling devices therefor, are fully illustrated in Figs. 9 to 12 of the drawings. The circuit breaker is preferably mounted in a case 42 which is provided with a removable top 43 having a glass panel 44, so that the adjustment of the devices may be observed from the exterior of the case. The case 42 is preferably supported by brackets 45 and 46 which are removably connected to lugs 47 formed integral with one of the end plates of a heater case.

Extending longitudinally of the case 42 and attached to the interior face of the ends thereof are the rails 48 between which is mounted a sliding yoke member 49 having a stem 50 projecting through one end of the case 42. The yoke 49 carries a sleeve 51 of insulating material which is retained in position by a threaded collar 52. Within the sleeve 51 is a metallic sleeve 53 in which is slidably mounted a metallic stem 54, which is retained from rotation therein by a lug on said sleeve operating in a slot in the stem. The outer end of the stem 54 carries a terminal arm 55 to which the end of the lead 39 is connected. The opposite end of the stem 54 carries in threaded engagement therewith a head 56. A light spring 57 is interposed between the inner end of the sleeve 53 and the head 56, the tendency of the spring being to actuate the stem 54 inwardly. At the opposite end of the case 42 and likewise supported by the rails 48 is a second terminal carrying yoke 58 in which is mounted an insulated terminal stem 59, the outer end of which carries a terminal arm 60 to which the end of the lead 41 is connected.

The stem 59 is mounted in a sleeve 61 of insulating material which is carried in a sleeve 62 formed integral with the yoke 58, said sleeve being held in position by a threaded collar 63. The stem 59 is provided at its inner end with a head 64 of similar construction to the head 56.

A stem 100 having terminal heads 101—102 respectively is mounted in a sleeve 103 of insulating material which is mounted in a cylindrical block 66 which is formed rigid with the rails 48. A threaded collar 104 is adapted to be threaded into the block 66 and serves as a means for retaining the sleeve 103 of insulating material in position in the block. The stem 100 is in axial alinement with the stems 54 and 59. A spring 65 of the expansion type is interposed between the rigid block 66 and the inner face of the slidable yoke 49, the tendency of which is to actuate the yoke and the terminal stem carried thereby away from the stem 100, so that the heads 56 and 101 will normally be out of contact with each other.

A spring 67 of the expansion type is interposed between the outer face of the slidable yoke member 58 and the head of the case, the tendency of said spring being to hold the yoke member and the carried stem 59 yieldingly toward the center of the case. The head 64 of the stem 59, when in normal adjustment, is in contact with the head 102 of the stem 100.

The yoke member 49 and its carried parts are adapted to be moved inwardly so as to bring the head 56 in contact with the head 101, in order to close the circuit, by means of a pressure-operated valve 68 in the main supply passage. As the details of construction of the pressure-operated valve 68 are not original with me it is unnecessary to make a detailed explanation of this construction. Suffice it to say that when water is withdrawn from the supply passage the stem 69 of the valve will move outwardly and, as it is in axial alinement with the stem 50, the yoke 49 and its carried parts will be moved inwardly against the tension of the spring 65, so that the head 56 will be brought into contact with the head 101, closing the circuit and energizing the heating units. The extent of movement of the stem 69 is dependent upon the degree to which the service faucet is open. This is true because the pressure in the service passage controls the actuation of the valve 68. The stems 50 and 69 are in axial alinement and spaced apart only a sufficient distance to provide for contact between them when the service faucet is open to a minimum degree. Whenever, therefore, the service faucet is utilized the stem 69 will move sufficiently to force the stem 50 and the yoke 49 inwardly far enough to bring the head 56 in contact with the head 101 and thereby close the circuit. If the faucet is open to a greater extent and the stem 69 is moved outwardly thereby the yoke 49 and its carried parts will move inwardly compressing the small spring 57, the heads 56 and 101 remaining in contact. This construction causes the closing of the circuit immediately upon the withdrawing of any quantity of water from the service faucet, and additional movement of the pressure valve is provided for by the yielding or compression of the spring 57.

Additional control of the supply of electrical energy for the heating units so that the temperature of the water passing from the heater may be prevented from rising above a predetermined maximum is effected by moving the head 64 away from the head 102, while the yoke 49 and its carried parts are held in their innermost adjustment by the withdrawal of water from the service faucet. The mechanism for moving the head 64 out of contact with the head 102 comprises a compound lever construction including the lever 70 which is fulcrumed in supports 71 attached to the side of the case 42. The lever 70 is preferably in the form shown in Fig. 11 of the drawings. By reference to this figure it will be seen that the short arm of the lever is in contact with the stem 72, which is a part of the thermostat, the details of the construction of which will be explained hereinafter. The long arm of the lever 70 is irregularly shaped, as shown in the drawings, the extremity thereof being bifurcated and embracing the pin 73, the head 74 of which projects outwardly through an opening in the case. The opening is sufficiently large to permit the head 74 to slide therein. The pin 73 is provided with an enlargement 75 forming a shoulder against which the bifurcated arms of the lever 70 bear.

The inner end of the pin 73 is threaded and screws into a socket in a block 76 which is mounted in the arm 77 of a bell-crank lever 78. The bell-crank lever 78 is fulcrumed in brackets 79 extending inwardly from the case 42. The block 76 is seated in a recess in the arm 77 of the lever 78, which recess is large enough to permit the arm 77 of the lever 78 to move inwardly when the stem 73 is moved by the movement of the end of the lever 70. The arm 80 of the lever 78 is fork-shaped and extends on either side of the rails 48. The two extremities of the arm 80 of the lever 78 have pin and slot connection with links 81, which links 81 are connected to pins 82 which extend through slots 83 and are connected to the yoke member 58.

Between the side of the case 42 and the long arm of the lever 70 is a strong expansion spring 84, the tendency of which is to actuate the long arm of the lever 70 in the direction of the arrow 85 when the short arm is permitted to move outwardly by the retraction of the stem 72 of the thermostat. This movement of the lever 70 swings the arm 80 of the lever 78 toward the end of the case and, through the link connection with the yoke member 58, moves the yoke member and the parts carried thereby toward the end of the case against the tendency of the spring 67, thereby withdrawing the head 64 away from the head 102 and breaking the electrical circuit. A retraction spring 86 secured to the outer end of the arm 77 of the lever 78 serves to restore the parts to normal position when the inward pressure on the stem 73 is released by the extremity of the lever 70 being moved toward the side of the case by pressure on the short arm of the lever exerted by the stem 72. By the adjustment of the stem 73 for which purpose a key-receiving socket 87 is formed in the head 74 thereof the connection between the levers 70 and 78 may be regulated. By adjusting the relationship of the levers 70 and 78 the temperature at which the circuit will be broken may be predetermined.

It will be observed that when the distance between the long arm of the lever 70 and the arm 77 of the lever 78 is increased a slight degree of inward movement of the stem 72 will result in effecting a breaking of the circuit and that, when the levers are so adjusted by the manipulation of the stem 73 that the arm 77 of the lever 78 is moved nearer to the extremity of the lever 70, a greater movement of the short arm of the lever 70 will be required to effect the breaking of the circuit.

The stem 72 is controlled by the thermostatic device, most clearly shown in Fig. 10 of the drawings. As shown, the thermostatic device comprises an outer case 88 upon one end of which is threaded a T-casting 89 into which is connected the pipe 10 leading from the coil system. The casting 89 has an annular flange 90 which bears against the inner face of the case of the heater, and one arm of said casting passes through an opening in the case and is adapted to receive a threaded washer 91, which serves to clamp the end of the fitting in position and constitutes a support for the end of the case of the thermostat. The opposite end of the case 88 of the thermostat is threaded into a T-casting 92 which is formed integral with the side of the case 42 and is provided with an annular flange 93 bearing against the outer face of the heater and held in position by a threaded washer 94, fitted over one end of the T-casting 92 and embracing an opening through the end of the heater case.

Within the case 88 is a tubular casing 95 which is held rigid by threaded engagement with one leg of the T-casting 92. The discharge passage 12 is connected into the T-casting 92, through which passage 12 the water is withdrawn from the thermostat.

The inner end of the casing 95 extends into the T-casting 89, but is free to move a slight distance, the end thereof being in normal adjustment away from the sealed head of the casting 89. Lugs 96 located adjacent to the end of the casing 95 bear against the sides of the casting 89 and constitute guides for maintaining the casing 95 in axial alinement within the case 88.

The stem 72 is connected to a rod 97, one end of which is rigidly secured to the end of the casing 95. The materials of which the casing 95 and the rod 97 are respectively made have different coefficients of expansion under the influence of heat, that of the casing 95 being greater than the rod 97 so that when the casing 95 is heated it will expand to a greater degree than the rod 97 and, as the rod 97 is secured to the free end thereof, said rod will be drawn inwardly carrying the stem 72 away from the end of the short arm of the lever 70. The inward movement of the stem 72 influences the operation of the circuit controlling device in the manner hereinbefore described. Thus, it will be apparent that the mechanism may be so adjusted that, when a predetermined temperature of the water passing from the coil system through the thermostat is attained, the supply of electrical energy to the heating units will be cut off, and that when the temperature again falls the electrical circuit will automatically be reëstablished so that the heating units will again be energized. Thus, the temperature of the water passing from the heater may be automatically regulated and maintained at a predetermined temperature.

Provision for draining the heater is made by providing a drain valve 98 located in the supply passage 8, below the level of the lowest coil. An inflow valve 99 for regulating the flow in the passage 8 or for cutting off the water supply, is provided in the supply passage 8, above the pressure-operated valve.

From the foregoing the operation and construction of the embodiment of the invention will be clearly apprehended, and it will also be understood that the invention does not reside entirely in the specific construction and that numerous modifications may be made without departing from the spirit and scope of the invention. I do not wish to limit myself, therefore, to the exact details of construction shown and described, but

What I claim and desire to secure by Letters Patent is:—

1. A water heater, comprising a series of coils, heating units disposed between the stretches of the coils, a source of electrical energy for energizing the heating units, and automatic means under the influence of the pressure in said coils for controlling the electrical energy for energizing the heating units, substantially as specified.

2. A water heater, comprising a sealed case, a series of water coils arranged in said case, a series of heating units disposed between the stretches of the coils, an electric circuit into which said heating units are connected, a device controlled by the differences of pressure in said coils for making and breaking said electrical circuit, a thermostat located within the case and under the influence of the temperature of the water passing from said coils, and automatic devices under the control of said thermostat for breaking the electrical circuit when the water passing from the coils has reached a predetermined maximum degree of heat, substantially as specified.

3. A water heater, comprising a case, a series of coils disposed in said case, the stretches thereof being in vertical alinement and in parallel series, electrical heating units disposed between said parallel series of stretches of said coils, a supply passage for supplying water to the lower part of said coil system, a discharge passage leading from the upper part of said coil system, a thermostat in said discharge passage, an electrical circuit for said heating units, a device operable to close said circuit when the water is withdrawn from said discharge passage, and a device under the control of said thermostat for breaking said circuit when the degree of heat of water passing from said discharge passage has attained a predetermined maximum temperature.

4. A water heater, comprising a case, a series of coils disposed in said case, the stretches thereof being in vertical alinement and in parallel series, electrical heating units disposed between said parallel series of stretches of said coils, a supply passage for supplying water to the lower part of said coil system, a discharge passage leading from the upper part of said coil system, a thermostat in said discharge passage, an electrical circuit for said heating units, a device operable to close said circuit when the water is withdrawn from said discharge passage, and a selectively settable device under the control of said thermostat for breaking said circuit when the degree of heat of water passing from said discharge passage has attained a predetermined maximum temperature.

5. A water heater, comprising a case, a lining of refractory material for said case, a coil system arranged in said case and comprising a series of coils connected to form a continuous, tortuous passage, said coils being arranged in vertical series with the stretches thereof disposed parallel to each other, heating units adapted to be removably set between the parallel stretches of said coil system, a supply passage leading into the lower end of said coil system, a discharge passage leading from the upper end of said coil system, a thermostat in said discharge passage, a pressure-operated valve in said supply passage, means under the control of said pressure-operated valve for energizing the heating units, and a selectively settable device actuated by said thermostat for controlling the supply of energy to said heating units, substantially as specified.

6. A heater, comprising a series of coils arranged to receive electrical heating units between the stretches thereof, electrical heating units comprising a circuit of resistance material, an insulated case for receiving said circuit, an electrical circuit connected with said heating units, a device under control of the pressure in said coil system for controlling said electrical circuit, and a supplemental control for said electrical circuit, whereby the circuit will be broken when a predetermined maximum degree of heat has been attained by the water passing from said coil system, substantially as specified.

7. A heater, comprising a coil system, heating units arranged adjacent to the coil system and adapted to impart heat thereto, an electric circuit for said heating units, a circuit breaker in said circuit, means under the influence of the pressure of the water in said coil system for controlling said circuit breaker, and means under the influence of heat generated by said heating units for controlling said circuit breaker, substantially as specified.

8. A water heater, comprising a series of coils arranged in a sealed case and having spaces between the stretches of the coils, heating units each comprising a rectangular case adapted to be removably positioned between said stretches of the coil, a core arranged in said last named case, a resistance circuit wound upon and supported by said core and having terminals extending through one wall of the case, a supplemental case located exteriorly with respect to the heater case, electrical connections in said supplemental case, and terminal plugs extending from the terminals of the resistance circuits through the wall of the heater case and connecting with said electrical connections in said supplemental case, substantially as specified.

9. A heater comprising a coil system arranged in a case and having spaces between the stretches of the coils, heating units adapted to be positioned between the stretches of the coils, an electric circuit connected with said heating units, a circuit breaker in said circuit comprising movable terminals, a connecting terminal between said movable terminals, and automatic devices for moving said movable terminals, substantially as specified.

10. In a water heater, a coil system, heating units arranged adjacently to the coil system and adapted to impart heat thereto, an electric circuit connected with said heating units, a movable terminal in said electric circuit, mechanism operated by the pressure in said coils for moving said movable terminal to make and break the electrical circuit, substantially as specified.

11. In a water heater, a coil system, heating units adapted to impart heat to water circulating through said coil system, an electric circuit connected with said heating units, a stationary terminal in said circuit, two movable terminals adapted to move into and out of contact with said stationary terminal, mechanism controlled by the pressure of water in the supply passage for moving one of said movable terminals, and mechanism controlled by the temperature of the water in the discharge passage for said coil system for moving the other of said terminals, substantially as specified.

12. In a water heater, the combination with a series of coils and electrical heating units therefor, of an electric circuit for energizing said heating units, a stationary terminal in said circuit, two removable terminals adapted to be moved into and out of contact with said stationary terminal, a supply passage for the coil system, a discharge passage for the coil system, a device located in and adapted to be operated by pressure in the supply passage for moving one of said movable terminals, and a thermostatic device located in the discharge passage for controlling the movement of the other of said terminals.

13. In a water heater, the combination with a coil system and electrical heating units therefor, of an electric circuit for energizing said heating units, a stationary terminal in said circuit, two movable terminals adapted to be moved into and out of contact with said stationary terminal, automatic means controlled by the pressure of water delivered to said coil system for moving one of said terminals, and automatic means under the influence of the heat of the water passing from said coil system, including a selectively settable device, operable effectively to move the other of said movable terminals out of contact with said stationary terminal, when a predetermined degree of heat has been attained by the water passing from the coil system.

14. In a water heater, the combination with a coil system and heating units therefor, of an electric circuit connected with said heating units, a stationary terminal in said circuit, a movable terminal normally in contact with said stationary terminal, means under the influence of the heat of the water discharging from said coil system for moving said movable terminal out of contact with said stationary terminal, substantially as specified.

15. In a water heater, the combination with a coil system and electrical heating units therefor, of an electric supply connected with said heating units, a stationary terminal within the electric circuit of said supply, a movable terminal normally in contact with said stationary terminal, a second movable terminal normally out of contact with said stationary terminal, means under the influence of pressure in the water supply of said coil system for moving said last-named movable terminal into contact with said stationary terminal, and optionally adjustable mechanism under the influence of the heat of the water in said coil system for moving said first-named movable terminal out of contact with said stationary terminal, while said second-named movable terminal is held in contact with said stationary terminal, substantially as specified.

In witness whereof, I have signed this specification in the presence of two subscribing witnesses.

MAURICE SIMON.

Witnesses:
N. G. BUTLER,
L. C. KINGSLUND.